United States Patent [19]

Fischer

[11] Patent Number: 4,572,708
[45] Date of Patent: Feb. 25, 1986

[54] EXPANSIBLE WALL PLUG

[76] Inventor: Artur Fischer, Weinhalde 34, 7244 Waldachtal 3/Tumlingen, Fed. Rep. of Germany

[21] Appl. No.: 571,517

[22] Filed: Jan. 17, 1984

[30] Foreign Application Priority Data

Jan. 18, 1983 [DE] Fed. Rep. of Germany ....... 3301389

[51] Int. Cl.⁴ .................................................. F16B 13/06
[52] U.S. Cl. ................................. 411/22; 411/57; 411/60
[58] Field of Search ................. 411/21, 23, 57, 411/60

[56] References Cited

U.S. PATENT DOCUMENTS

| 983,451 | 2/1911 | Kennedy | 411/57 |
| 1,021,794 | 4/1912 | Pleister | 411/21 |
| 1,087,299 | 2/1914 | Kennedy | 411/21 |
| 1,138,219 | 5/1915 | Hottenroth | 411/57 |
| 1,921,794 | 8/1933 | Tomkinson | 411/23 |
| 2,287,395 | 6/1942 | Reynolds | 411/23 |
| 4,416,048 | 11/1983 | Otte | 411/32 X |

FOREIGN PATENT DOCUMENTS

| 2909309 | 9/1980 | Fed. Rep. of Germany | 411/57 |
| 2925603 | 1/1981 | Fed. Rep. of Germany | 411/57 |
| 661111 | 11/1951 | United Kingdom | 411/23 |
| 2071249 | 9/1981 | United Kingdom | 411/57 |

Primary Examiner—Thomas J. Holko
Attorney, Agent, or Firm—Michael J. Striker

[57] ABSTRACT

An expansible wall plug consisting of a slotted metal sleeve which engages a portion of its length into the article to be fastened, and an expansible portion which may be expanded by driving in a fastening screw. The expansible wall plug may be expanded using a fastening screw having a wood screw thread, because the expansible body consists of a plastic material and is provided with a tapered cavity and is slotted over a portion of its length. At least a portion of the length of the expansible body is inserted into the expansible portion of the metal sleeve, and is locked in a position in which the slot plane of the expansible body is aligned with the slot plane of the metal sleeve by way of projections on the periphery of the expansible body engaging recesses on the periphery of the metal sleeve.

6 Claims, 3 Drawing Figures

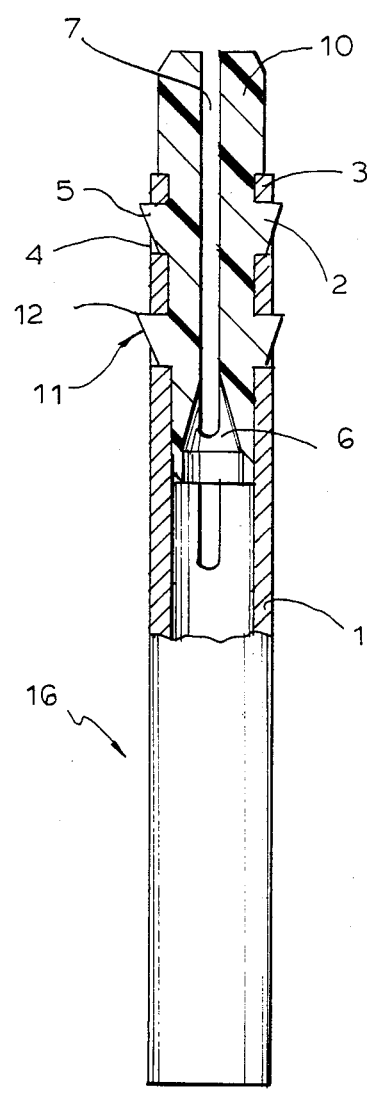
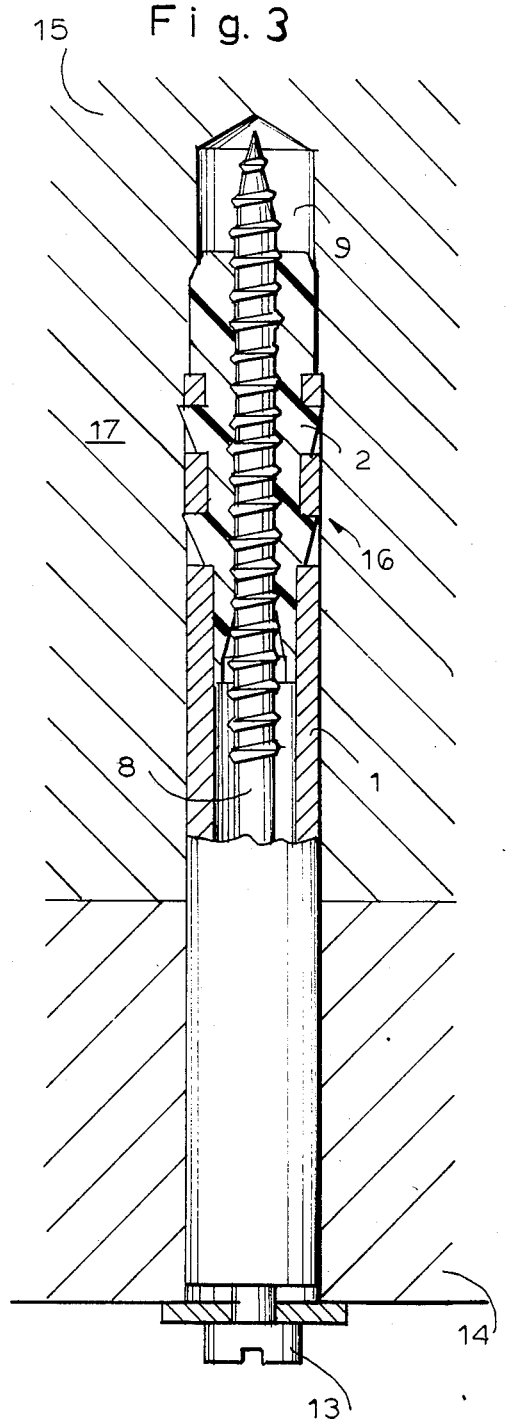

EXPANSIBLE WALL PLUG

BACKGROUND OF THE INVENTION

The present invention relates to an expansible wall plug. More particularly, it relates to an expansible wall plug having a slotted body that is expandable upon the insertion of a screw.

Expansible wall plugs of the above-mentioned general type are known in the art. In the preferred push-through type of plug, made entirely of plastic, the diameter of the hole in the article to be mounted and the diameter of the hole in the masonry are the same. This allows the wall plug to be pressed through the hole in the article and into the hole in the masonry without having to remove the article. When a plastic plug is used, a higher pitched wood screw thread as opposed to a machine screw thread, is used allowing for shorter assembly time. However, the transverse forces absorbed by the plastic plug sleeve are less than those absorbed by a wall plug having a metal expansible plug and also the metal expansible plug requires a machine screw thread to expand the sleeve.

SUMMARY OF THE INVENTION

Accordingly, it is an object of the present invention to provide an expansible wall plug which avoids the disadvantage of the prior art.

More particularly, it is an object of the present invention to provide an expansible wall plug that utilizes a fastening wood screw thread to effect the expansion while enjoying the larger transverse holding forces exhibited by an expansible metal sleeve.

In keeping with these objects, and with others which will become apparent hereinafter, one feature of the present invention resides, briefly stated, in an expansible wall plug having an expansible plastic body, slotted over a portion of its length, that is expanded upon insertion of a screw wherein at least a portion of the slotted expansible plastic body is inserted into a slotted expansible metal sleeve, and also there is provided locks to prevent the former from rotating within the latter, while keeping the slot plane of the slotted plastic expansible plug aligned with the slot plane of the slotted metal sleeve.

When the expansible wall plug is designed in accordance with the present invention, a wood screw thread expands the slotted expansible plastic plug which in turn expands the slotted expansible metal sleeve which allows the expansible wall plug of the present invention to exhibit greater transverse forces on the walls of the masonary hole.

In accordance with another feature of the present invention, the slotted expansible plastic plug is provided with a tapering cavity at its base that communicates with its slot.

Still another feature of the present invention is that the slotted expansible plastic plug has projections that communicate with slots in the slotted metal sleeve.

A further feature of the present invention is that the thread of the wood screw cuts into and engages with the expansible plastic plug which in turn is securely affixed to the metal sleeve.

A still further feature of the present invention is that the projections of the slotted expansible plastic plug are on its periphery and the slots in the slotted metal sleeve are on its periphery.

A yet further feature of the present invention is that the projections of the slotted expansible plastic plug face towards the rear end of the plug and exhibit a chamfered saw-tooth shape.

A yet still further feature of the present invention is that the projections of the slotted plastic expansible plug project past the periphery of the slotted metal sleeve when the slotted plastic plug is secured within the slotted metal sleeve.

Finally, still a further feature of the present invention is that a portion of the slotted plastic expansible plug extends past the slotted metal sleeve, and this portion has the same diameter as the external diameter of the slotted metal sleeve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view, in partial section, showing the expansible wall plug of the present invention before the wood screw is inserted;

FIG. 3 is a side view, in partial section showing, in an anchored state, the expansible wall plug of FIG. 1.

DETAILED DESCRIPTION OF THE PREFERRED EMBODIMENTS

Figure 2:
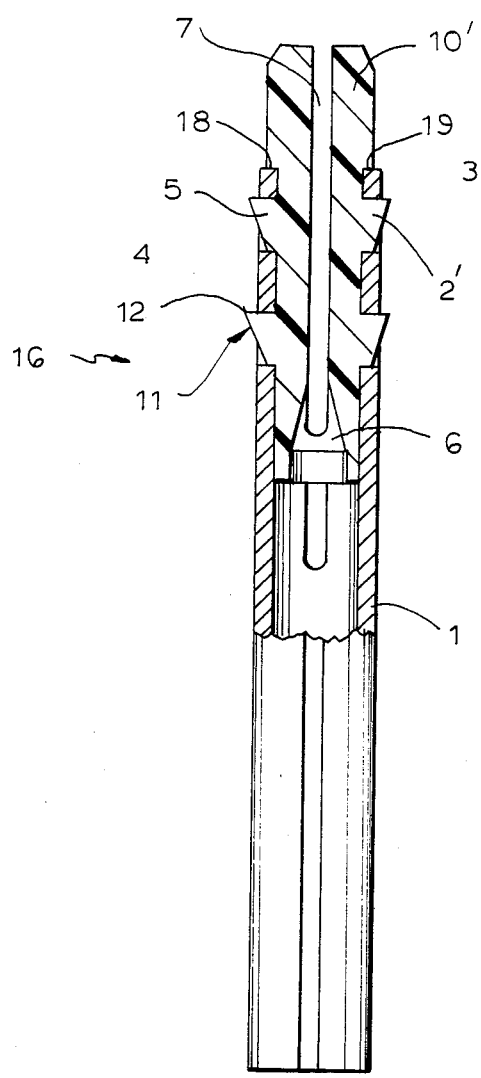
FIG. 2 is a side view, in partial section, of an alternate embodiment of the present invention shown in FIG. 1.

Referring now to FIG. 1, the expansible wall plug is shown generally at (16) consisting of a metal sleeve (1) having a slot over a portion of its length and an expansible body (2) of plastic material which is disposed within an expansible portion (3) of the metal sleeve (1). The expansible body (2) is held in the metal sleeve (1) by projections (5) disposed on the periphery of the expansible body (2), engaging in recess (4) disposed on the metal sleeve (1). The expansible body (2) has a tapering bore (6) and a longitudinal slot (7) extending over a portion of the length of the expansible body (2). As a fastening screw (8) is inserted, the expansible body (2) is forced open and produces an expansion pressure that acts in the radial direction on the metal sleeve (1) and thus results in anchorage of the plug in a bored hole (9) of a masonery material (17). In order for the expansion of the expansible body (2) to simultaneously occur with the expansion of the metal sleeve (1), the expansible body (2) is held in the metal sleeve (1) by the projections (5) so that the slot plane of the expansible body (2) is aligned with the slot plane of the metal sleeve (1). A slot plane is defined as that plane formed by two imaginary lines spaced apart and drawn perpendicularly from the longitudinal axis of the plug to the respective slot.

For different applications, the expansion length of the expansible wall plug (16) can be changed by extending or retracting the expansible body (2) relative to the metal sleeve (1).

When the expansible body (2') (see FIG. 2) is extended past the outside of the metal sleeve (1), the external diameter of the extended portion (10') is equal to the external diameter of the metal sleeve (1). A shoulder (18) of the extended portion (10') butts against a leading end face (19) of the metal sleeve (1) in addition to the projections (5), acts as an aid to assembly, to limit the degree of insertion of the expansible body (2') in the metal sleeve (1).

An additional aid to the assembly is afforded by a chamfer (11) disposed on the peripheral surface of the projections (5). The chamfers (11) aids the expansion of the metal sleeve (1) upon insertion of the expansible body (2, 2'). When the metal sleeve (1) has returned to its non-expansible position after the projections (5) have been fully received by the recesses (4), the expansible body (2, 2') will be securely affixed within the metal sleeve (1).

As the driving of the fastening screw (8) begins, the expansible wall plug (16) is prevented from turning within the bore (8) because slight projections (12) of the projections (5) extend beyond the periphery of the metal sleeve (1), allowing the expansible body (2, 2') to be affixed to the sides of the bore (9).

To operate and anchor the expansible wall plug (16), as shown in FIG. 2, the fastening screw (8) is driven into the expansible body (2). Because of the tapering cavity (6) of the expansible body (2), the expansible body and also the metal sleeve (1) is forced open and anchored in the bore (9). An article (14) is now clamped against a masonry (17) by use of a screw head (13).

It will be understood that each of the elements described above, or two or more together, may also find a useful application in other types of an expansible wall plug differing from the types described above.

While the invention has been illustrated and described as embodied in a construction, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansible wall plug for fastening an article with a fastening screw, comprising
an outer elongated metal sleeve having an expansible portion and insertable into the article to be fastened;
an inner elongated plastic body insertable into said outer elongated metal sleeve and having an expansible portion and a hollow interior so that the fastening screw can extend through said hollow interior of said inner elongated plastic body; and
means for locking said outer elongated metal sleeve with said inner elongated plastic body for preventing their relative rotation, said locking means including recesses on said outer elongated metal sleeve and projections on the periphery of said inner elongated plastic body, wherein said outer metal sleeve has a rear end, said projections having an external surface that faces said rear end of said outer metal sleeve and is chamfered to form a saw-tooth shape so as to allow for simpler insertion of said inner elongated metal sleeve.

2. The expansible wall plug as defined in claim 1, wherein each of said outer elongated metal sleeve and said inner elongated plastic body have a length, a periphery, and a longitudinal slot disposed on said periphery of a portion of said length so as to allow for expansion.

3. The expansible wall plug as defined in claim 2, wherein said longitudinal slots are aligned so as to maximize the expansion of said expansible portion of said outer elongated metal sleeve.

4. The expansible wall plug as defined in claim 1, wherein said inner elongated plastic body has a tapered cavity for receiving the fastening screw.

5. The expansible wall plug as defined in claim 1, wherein said projections of said inner elongated plastic body that are disposed in said recesses of said outer elongated metal sleeve protrude slightly past said periphery of said outer elongated metal sleeve to provide additional gripping power.

6. The expansible wall plug as defined in claim 1, wherein said outer elongated metal sleeve has an external diameter and a front end face and said inner elongated plastic body has a portion projecting beyond said front end face, said projecting portion having a diameter equal to said external diameter of said outer elongated metal sleeve.

* * * * *